United States Patent
O'Rear et al.

(10) Patent No.: US 10,093,556 B2
(45) Date of Patent: Oct. 9, 2018

(54) PROCESSES FOR REMOVING METAL PARTICLES FROM WATER

(71) Applicant: Chevron U.S.A. Inc., San Ramon, CA (US)

(72) Inventors: Dennis John O'Rear, Petaluma, CA (US); Thomas Peter Hoelen, Oakland, CA (US); Kevin J. Grice, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 267 days.

(21) Appl. No.: 14/933,084

(22) Filed: Nov. 5, 2015

(65) Prior Publication Data

US 2017/0129784 A1    May 11, 2017

(51) Int. Cl.

| | |
|---|---|
| *C02F 1/28* | (2006.01) |
| *B01J 20/12* | (2006.01) |
| *C10G 31/08* | (2006.01) |
| *C10G 33/06* | (2006.01) |
| *C10G 25/00* | (2006.01) |
| *B01J 20/20* | (2006.01) |
| *B01J 20/26* | (2006.01) |
| *C02F 1/40* | (2006.01) |
| *C02F 101/20* | (2006.01) |
| *C02F 101/32* | (2006.01) |
| *C02F 103/36* | (2006.01) |
| *C02F 101/10* | (2006.01) |
| *C02F 103/10* | (2006.01) |

(52) U.S. Cl.
CPC .............. *C02F 1/28* (2013.01); *B01J 20/12* (2013.01); *B01J 20/20* (2013.01); *B01J 20/26* (2013.01); *C02F 1/281* (2013.01); *C02F 1/285* (2013.01); *C10G 25/00* (2013.01); *C10G 31/08* (2013.01); *C10G 33/06* (2013.01); *C02F 1/283* (2013.01); *C02F 1/286* (2013.01); *C02F 1/40* (2013.01); *C02F 2101/10* (2013.01); *C02F 2101/20* (2013.01); *C02F 2101/32* (2013.01); *C02F 2103/10* (2013.01); *C02F 2103/365* (2013.01); *C10G 2300/205* (2013.01)

(58) Field of Classification Search
CPC .. C02F 1/28; C02F 1/281; C02F 1/285; C02F 2103/10; C02F 2101/10; C02F 2101/20; C02F 1/40; C02F 2101/32; C02F 2103/365; C10G 25/00; C10G 33/06; C10G 31/08; C10G 2300/205; B01J 20/00

See application file for complete search history.

(56) References Cited

U.S. PATENT DOCUMENTS

| | | | |
|---|---|---|---|
| 3,579,032 A | 5/1971 | Jacobs | |
| 4,874,528 A * | 10/1989 | Foreman | ............... B01D 17/047 210/705 |
| 2011/0247982 A1* | 10/2011 | Alsewailem | ............. B01J 20/12 210/679 |
| 2012/0222301 A1 | 9/2012 | Moon et al. | |

OTHER PUBLICATIONS

Hua Li, Lifen Liu, Fenglin Yang, Oleophilic Polyurethane Foams for Oil Spill Cleanup, Procedia Environmental Sciences, vol. 18, 2013, pp. 528-533.
Kang, Yingke, et al. "Preparation of porous super-hydrophobic and super-oleophilic polyvinyl chloride surface with corrosion resistance property." Applied Surface Science 258.3 (2011).
Removing Hydrocarbons from Water.
Victoria Broje and Arturo A. Keller, Optimization of Oleophilic Skimmer Recovery Surface: Field Testing at Ohmsett Facility. MMS contract No. 1435-01-04-RP-36248, Final Report Jun. 2006 by Victoria Broje and Arturo A. Keller.

* cited by examiner

*Primary Examiner* — Randy Boyer
*Assistant Examiner* — Juan C Valencia
(74) *Attorney, Agent, or Firm* — Karen R. DiDomenicis; Howard V. Owens

(57) ABSTRACT

Disclosed is a process to remove neutrally buoyant metal particles composed of solid particles and droplets of oil from water such as produced water from petroleum production or refinery wastewater. In one aspect, the water is contacted with oleophilic adsorbent materials which adsorb the neutrally buoyant metal particles. Also disclosed is a process for removing metal particles from a fluid volume that includes crude oil and/or condensate. The fluid volume is washed with a volume of water to form a volume of wastewater, thereby transferring at least a portion of the metal particles from the fluid into the wastewater. The volume of wastewater including the transferred metal particles is then contacted with an oleophilic adsorbent material wherein the neutrally buoyant metal particles are adsorbed by the adsorbent material. The adsorbent material is then separated from the wastewater. Finally, the treated wastewater is used to wash the crude and/or condensate.

20 Claims, No Drawings

PROCESSES FOR REMOVING METAL PARTICLES FROM WATER

FIELD

The present disclosure relates generally to processes for treating water to remove metal particles using an oleophilic adsorbent material. The disclosure further relates to processes for treating crude oil and/or condensate to remove metal particles.

BACKGROUND

Contaminated water, such as wastewater from hydrocarbon production operations or crude refining operations, needs to be treated prior to discharge into the environment, including when it is injected into an underground aquifer. Metal impurities in the wastewater generally need to be controlled to low levels. Many technologies are known to remove metal impurities from wastewater. Dense solid metal particles are often removed by allowing the wastewater to reside in tanks without stirring. The particles that are denser than water fall or settle to the bottom where they accumulate and can be removed. When metals are present in the ionic form, they can be removed by ion exchange or by precipitation and settling. Froth flotation and skimming is another known technology that can be used to remove the metal particles. Typically the process includes of a froth flotation vessel with a skimmer. This operation is typically referred to as "gas flotation" or "inert gas flotation." The purpose of this operation is to remove oil from the water. The wastewater is sparged with an inert gas, and the oil accumulates on the surface where it is removed by a skimmer. Another operation to remove oil from water is a hydrocyclone.

In petroleum operations, i.e., crude oil refining or production, metal particles in wastewater that contain a relatively large amount of oil are not neutrally buoyant and will float to surface and can be removed by skimmers or hydrocyclones. Metal particles that contain a relatively low amount of oil are also not neutrally buoyant and will sink to the bottom and can be removed as sludge from the bottom of tanks. Metal particles containing or coated with oil can be neutrally, or near neutrally, buoyant. The oil is a crude oil or a crude oil component. Without the oil, the metal particles would be dense enough to settle, but in many cases, a proportion of the metal particles contain sufficient lower density oil that those aggregated oil-metal particles are neutrally buoyant. Ion exchange and settling are ineffective at removing neutrally buoyant metal particles. It is possible to remove such neutrally buoyant metal particles by filtration or centrifugation, but both of these processes are energy intensive and costly. Often the volumes of wastewater are large, making it impractical to use either filtration or centrifugation. A further difficulty in removing neutrally buoyant metal particles is the motion in the water due to the action of pumps and fluid flow through tanks and the like, preventing the particles from settling. What is needed is a process to remove neutrally buoyant metal particles from large volumes of water, e.g., wastewater, which is less energy intensive and costly than the currently known solutions.

In wastewater processing using oxidation ponds, a majority of the neutrally buoyant metal particles are removed. Without wishing to be bound by theory, it is believed that the microbes in the oxidation pond consume the oil in the aggregated oil-metal particles, rendering the particle no longer neutrally buoyant, so that the particle then sinks and becomes part of the biomass sludge. This approach removes a majority of the metal particles, but further removal can be required to meet discharge specifications. Additionally, the microbes in the oxidation pond are living organisms and can be compromised by variations in temperature, salinity, oxygen content, and toxins. When the microbes are compromised, the ability of the oxidation pond to remove the neutrally buoyant particles is also compromised.

What is needed is a process to augment or support the natural processes that occur in the oxidation ponds.

SUMMARY OF THE INVENTION

In one aspect, a process is provided for removing neutrally buoyant metal particles from water. A volume of water containing neutrally buoyant metal particles is contacted a with an oleophilic adsorbent material wherein the neutrally buoyant metal particles are adsorbed by the oleophilic adsorbent material.

In another aspect, a process is provided for removing metal particles from crude oil, condensate or a combination thereof. The process includes washing a fluid volume that includes crude oil, condensate or a combination thereof and metal particles with a volume of water to form a volume of wastewater, thereby transferring at least a portion of the metal particles from the fluid volume into the volume of wastewater. The volume of wastewater including the transferred metal particles is then contacted with an oleophilic adsorbent material wherein the metal particles are adsorbed by the oleophilic adsorbent material. The oleophilic adsorbent material is then separated from the volume of wastewater thereby forming a treated volume of wastewater. Finally, the treated volume of wastewater is used in the washing step to wash the crude, condensate or combination thereof.

DEFINITIONS

The following terms will be used throughout the specification and will have the following meanings unless otherwise indicated.

Wastewater refers to water that must be disposed of which contains metal particles. In one embodiment, the concentration of metals in the form of metal particles in the wastewater is greater than or equal to 1 parts per trillion (ppt) by mass. In another embodiment, the concentration of metals in the form of metal particles in the wastewater is greater than or equal to 1 parts per billion (ppb) by mass. In another embodiment, the concentration of metals in the form of metal particles in the wastewater is greater than or equal to 1 parts per million (ppm) by mass. Examples of wastewater include produced water and refinery wastewater.

Produced Water refers to water that leaves a hydrocarbon producing well along with gas, crude and/or condensate. If the produced water leaves the well as a liquid, it is commonly referred to as formation water. If the produced water leaves the well as a vapor, and subsequently condenses to a liquid, is to commonly referred to as condensed water. Neutrally buoyant metal particles can be found in either form of produced water although they are often more abundant in formation water.

Refinery Wastewater is water that is generated during the refining of crude or condensate and can originate from any number of processes in the refinery including, but not limited to, desalters, overhead condensers, tank heels, API separators, biological oxidation ponds, and the like Treated Wastewater is water from which at least a portion of the metal particles have been removed. The treated wastewater can be used for many purposes including, for example, washing a crude, condensate or a combination thereof in which metal particles are removed from the crude or condensate. In one embodiment, described further hereinafter, a crude and/or condensate is washed with water, the metal particles are removed from the water, and the treated wastewater is further reused in the washing step. Thus, an effective method of removing metal particles from crude or condensate is achieved.

Metal Particles include particles that contain any of: Arsenic (As), Iron (Fe), Manganese (Mn), Molybdenum (Mo), Mercury (Hg), Sodium (Na), Lead (Pb), Antimony (Sb), Selenium (Se), Zinc (Zn) and combinations thereof.

Oily Metal Particles are particles associated with oil droplets as observed by optical microscopy.

Neutrally Buoyant Particles refers to particles that remain suspended in an aqueous system for 15 minutes after all motion of the fluid has stopped. The particles can be removed by filtration through a 0.2 μm filter. "Neutrally buoyant mercury particles" refers to particles that contain mercury and which are neutrally buoyant. Neutrally buoyant particles are composed of aggregates of solid particles and droplets of oil. The presence of the solid particles and the oil droplets can be observed by optical microscopy.

Oleophilic Adsorbents refers to adsorbent materials which adsorb oil while in the presence of water. In one nonlimiting embodiment, an oleophilic adsorbent is defined as: when 1 wt % of an adsorbent is mixed with 10 grams of water containing 0.1 grams of Superla® White Oil (available from Chevron Products Company, San Ramon, Calif.) and filtered through a 0.45 μm filter, the water contains less than 100 ppm oil as determined by an InfraCal Analyzer (available from Spectro Scientific, Chelmsford, Mass.). Examples of oleophilic adsorbents include activated carbons such as the oleophilic graphite disclosed in U.S. Pat. No. 3,532,625, polymers such as polypropylene, polyethylene, polyurethane, polyvinyl chloride and polystyrene, and oleophilic clays. Suitable polymers can be composed in part or completely from recycled materials. Suitable polypropylene materials include the polypropylene fibers disclosed U.S. Pat. No. Re. 31,087. Suitable polyethylene materials include the polyethylene disclosed in U.S. Pat. No. 3,579,032. Suitable polyurethane materials include the polyurethane disclosed in Hua Li, Lifen Liu, Fenglin Yang, Oleophilic Polyurethane Foams for Oil Spill Cleanup, Procedia Environmental Sciences, Volume 18, 2013, Pages 528-533. Oleophilic polyvinyl chloride (PVC) materials are disclosed in Kang, Yingke, et al. "Preparation of porous super-hydrophobic and super-oleophilic polyvinyl chloride surface with corrosion resistance property." Applied Surface Science 258.3 (2011): 1008-1013. Oleophilic clays are known for use as thickeners in drilling fluids. Examples include bentonite such as disclosed in U.S. Pat. No. 3,210,274, pulverulent clay products such as disclosed in U.S. Pat. No. 3,313,730, montmorillonite, kaolin, and halloysite.

DETAILED DESCRIPTION

In one embodiment, it has been found that neutrally buoyant metal particles can be removed from a volume of water, such as a volume of wastewater, by a process utilizing oleophilic adsorbents which selectively adsorb oil over water. When placed in contact with neutrally buoyant metal particles in the volume of water, these adsorbents adsorb the oil component of the metal particle-oil aggregate. By adsorbing the oil component, the entire aggregate can be removed from the volume of water. In one embodiment, the volume of wastewater containing neutrally buoyant metal particles is contacted with the oleophilic adsorbent. The oleophilic adsorbent can contact the wastewater by several processes including mixing and settling, mixing and filtering, contacting an adsorption column, contacting an adsorption pad and combinations of these processes. The mixture can then be separated, e.g. by filtration and/or settling, so that the adsorbents having the metal particles associated therewith are separated from the water.

In a mixing and settling process, the oleophilic adsorbent is mixed with the wastewater by use of slurry pumps, solid loading systems, and other devices. The wastewater with the adsorbent are mixed by convention methods such as in-line mixers, mixing pumps, continuously stirred tank reactors (CSTRs) and other equipment known in the industry. The settling can be accomplished by putting the mixture of the adsorbent and the produced water in a tank or pond with a low flow rate. The particles settle by gravity or migrate to the top of the water, depending on their density. Polymers and carbons tend to float while clays tend to sink.

In a mixing filtration process, the mixing is as described above and the filtration is done using one or more conventional filters (candle, dead end, cross flow, etc). Since the particle size of the adsorbent particle is much larger than the particle size of the neutrally buoyant metal particles, larger mesh sizes can be used with the treated water than with the original wastewater. This advantageously reduces the pressure drop and energy requirements. In one embodiment, the pressure drop for the filter can be less than or equal to 10 atmospheres. In another embodiment, the pressure drop for the filter can be less than or equal to 1 atmospheres. In another embodiment, the pressure drop for the filter can be less than or equal to 0.1 atmospheres.

In some embodiments that mix the oleophilic adsorbent with the wastewater, the amount of adsorbent is from about 1 ppm by weight to about 10 wt %. In another embodiment, the amount of adsorbent is from about 10 ppm by weight to about 1 wt %. In another embodiment, the amount of adsorbent is from about 100 ppm by weight to about 0.1 wt %.

An adsorption column can be used to hold the oleophilic adsorbent in the form of particles to treat the wastewater. Suitable adsorption columns are well known in the industry and can be operated either upflow or downflow. In one embodiment, the LHSV of the column is greater than or equal to 0.1 hr−1 and less than or equal to 1000 hr−1. In another embodiment, the LHSV of the column is greater than or equal to 1 hr−1 and less than or equal to 100 hr−1. In one embodiment, the LHSV of the column is greater than or equal to 5 hr−1 and less than or equal to 20 hr−1.

In one embodiment, the wastewater is mixed with the oleophilic adsorbent in an amount of from about 0.01 wt % to 25 wt %. The wastewater contacts the oleophilic adsorbent for at least a period of time sufficient that about 50 wt % of the neutrally buoyant metal particles in the water are adsorbed by the oleophilic adsorbent material. The temperature and pressures are near ambient when measured at the outlet of the adsorption step.

In one embodiment, the oleophilic adsorbent is in the form of a filter wherein the adsorbent material forms the filter body. The wastewater flows through or around the adsorbent such that sufficient contact is made between the wastewater containing the metal particles and the filter body.

In this embodiment, the ratio of the volume of the water to the ratio of superficial area of the adsorbent is from about 1 to about 1,000,000 cm.

In one embodiment, the adsorbent is in the form of a pad. This is especially useful for polymer oleophilic adsorbents. The pad can be part of a moving belt, with fresh pad supplied, and exhausted pad removed continuously.

In one embodiment, the process utilizing the adsorbent removes at least about 50 wt % of the metal particles as determined by the metal content of the wastewater before and after adsorption. In another embodiment, the process removes at least about 75 wt % of the metal particles. In another embodiment, the process removes at least about 90 wt % of the metal particles. In another embodiment, the process removes at least about 95 wt % of the metal particles. In another embodiment, the process removes at least about 99 wt % of the metal particles.

The wastewater can be optionally treated with an inert gas flotation process to remove oil and metal particles which have a density less than water prior to contacting the wastewater with the oleophilic adsorbent material. Alternatively or additionally, the wastewater can be optionally treated in a tank which allows the metal particles which have a density greater than water to settle by gravity prior to contacting the wastewater with the oleophilic adsorbent material.

The wastewater can be further treated in a biological oxidation process in which the wastewater is purified, e.g. in a biological oxidation pond. The adsorption of the neutrally buoyant metal particles can be performed prior to the inlet to the biological oxidation process, on the effluent from the biological oxidation process, on an intermediate stream (or streams) in the process, or a combination.

In one embodiment, the amount of oleophilic adsorbent relative to wastewater is sufficient to remove about 50 wt % or more of the oil in the water as measured by an InfraCal Analyzer (available from Spectro Scientific, Chelmsford, Mass.). In another embodiment, the amount of oleophilic adsorbent to wastewater is sufficient to remove about 75 wt % or more of the oil in the water. In another embodiment, the amount of oleophilic adsorbent to wastewater is sufficient to remove about 90 wt % or more of the oil in the water. In another embodiment, the amount of oleophilic adsorbent to wastewater is sufficient to remove about 99 wt % or more of the oil in the water. Other analyzers for oil in water can be used, but if results differ from the InfraCal, the results from the InfraCal should be accepted.

In one embodiment, a process is provided for removing metal particles from a fluid volume that includes crude oil, condensate or a combination thereof and metal particles. The process includes a washing step in which the contaminated crude oil and/or condensate is washed with a volume of water to form a volume of wastewater. In the washing step, at least a portion of the metal particles are transferred from the contaminated crude oil and/or condensate into the volume of wastewater. The volume of wastewater including the transferred metal particles, now neutrally buoyant metal particles, is then contacted with the oleophilic adsorbent material such that the neutrally buoyant metal particles are adsorbed by the oleophilic adsorbent material. The oleophilic adsorbent material can then be separated from the volume of wastewater to form a treated volume of wastewater. In one embodiment, the thus treated volume of wastewater can then be used in the washing step referred to above to wash the crude, condensate or combination thereof.

EXAMPLES

The illustrative examples are intended to be non-limiting.

Examples 1 to 15

Size Distribution of Particulate Mercury in Crudes and Condensates

Fifteen crude and condensate samples were vacuum filtered through 47 mm filters with pore sizes of 20 μm, 10 μm, 5 μm, 1 μm, 0.45 μm and 0.2 μm. The temperature of the filtration was set above the crude pour point. The total mercury in the crudes, condensates and their filtrates was determined using a RA 915 Atomic Absorption Mercury Spectrometer (available from Ohio Lumex Company, Inc., Twinsburg, Ohio), also referred to herein as a Lumex. The amount of mercury in each size fraction was determined by comparing the amount removed in successive filter sizes. On occasion, this resulted in negative numbers, which should be interpreted as meaning that there was little or no particulate mercury in this size range. Results are summarized in Table 1.

TABLE 1

| Ex. No | Source | Filt. Temp, C. | Hg, ppb | Percent Hg removed in each size fraction | | | | | | | % Part. Hg > 0.2 μm | % Part. Hg By Cent. |
|---|---|---|---|---|---|---|---|---|---|---|---|---|
| | | | | >20 μm % | 10-20 μm % | 5-10 μm % | 1-5 μm % | 0.45-1 μm % | 0.2-0.45 μm % | <0.2 μm % | | |
| 1 | SE Asian Crude-1 | 65 | 1,947 | 42 | 10 | 1 | −4 | 34 | 1 | 16 | 84 | |
| 2 | North Am. Crude-1 | 70 | 1,256 | 35 | 18 | 21 | 7 | 4 | 0 | 16 | 84 | 76 |
| 3 | SE Asian Condenate-1 | Room Temp. | 2,102 | 89 | 5 | −3 | 3 | 6 | 1 | 0 | 100 | 92 |
| 4 | SE Asian Condenate-2 | 48 | 1,510 | 3 | 0 | 8 | 12 | 3 | −2 | 76 | 24 | 22 |
| 5 | SE Asian Crude-2 | 70 | 230 | 19 | 10 | 19 | −2 | 25 | 1 | 28 | 72 | |
| 6 | SE Asian Crude-3 | 70 | 360 | 16 | 8 | 9 | −1 | 24 | 2 | 43 | 57 | |
| 7 | SE Asian Crude-4 | 70 | 429 | 9 | −8 | 19 | −2 | 32 | 2 | 48 | 52 | |
| 8 | SE Asian Crude-5 | 70 | 940 | 14 | 59 | 14 | 0 | 5 | 0 | 8 | 92 | |

TABLE 1-continued

| Ex. No | Source | Filt. Temp. C. | Hg, ppb | Percent Hg removed in each size fraction | | | | | | | % Part. Hg > 0.2 μm | % Part. Hg By Cent. |
|---|---|---|---|---|---|---|---|---|---|---|---|---|
| | | | | >20 μm % | 10-20 μm % | 5-10 μm % | 1-5 μm % | 0.45-1 μm % | 0.2-0.45 μm % | <0.2 μm % | | |
| 9 | SE Asian Condenate-3 | 40 | 2,021 | 11 | 3 | 15 | −14 | 29 | −1 | 57 | 43 | 31 |
| 10 | North Am. Crude-2 | Room Temp. | 9,050 | 16 | 16 | 11 | 32 | 20 | 1 | 4 | 96 | 85 |
| 11 | SE Asian Condenate-4 | Room Temp. | 748 | 62 | 6 | 2 | 0 | 10 | 0 | 20 | 80 | 82 |
| 12 | SE Asian Condenate-5 | Room Temp. | 505 | 3 | 2 | 25 | 8 | 17 | 2 | 43 | 57 | 75 |
| 13 | SE Asian Condenate-6 | Room Temp. | 2,240 | 34 | 49 | 0 | −2 | 13 | −2 | 8 | 92 | 80 |
| 14 | SE Asian Condenate-7 | Room Temp. | 3,374 | 41 | 2 | 15 | −1 | 22 | 0 | 22 | 78 | 72 |
| 15 | SE Asian Condenate-8 | Room Temp. | 1,153 | 77 | 0 | −1 | 4 | 10 | 1 | 9 | 91 | 73 |

This data shows that the size distribution of mercury-containing particles in crudes and condensates varies significantly. The presence of fine particles, e.g., those with sizes of 0.2 μm and below, presents a problem for processes which remove mercury particles by filtration, centrifugation or settling.

All of these are examples of high mercury crudes and high mercury condensates. All of these have a percent particulate mercury concentration of 10% or more.

Mercury which passes through the smallest filter tested, 0.2 μm, is believed to be fine metacinnabar particles. EXAFS analysis of a series of solids removed from crudes detected only metacinnabar, and on occasion, a small amount of related solid mercury dithiol species with EXAFS structures matching the mercury-cysteine complex.

The percent particulate Hg was measured (1) by filtration using a 0.2 μm filter (as provided in Table 1) and (2) by centrifugation (data from Table 3). For most samples, the two methods agree reasonably well. The filtration method is used when there is a conflict.

Examples 16 to 20

Determination of Composition of Solids Components by EXAFS

In these samples, metacinnabar was determined to be the Hg species in stabilized crude. The examples show that the predominant form of mercury in solid residues from various stabilized crudes is metacinnabar. The metacinnabar particles are either very small (nanometer scale), highly disordered, or both.

Solid residues from several crude samples were analyzed by EXAFS to determine the composition of the solids components. The mercury coordination number (CN) was also measured. Efforts were made to identify other species, but they could not be detected and must be present at levels much less than 10 wt %. The searched-for species included: elemental mercury (on frozen samples), mercuric oxide, mercuric chloride, mercuric sulfate, and $Hg_3S_2Cl_2$. Also the following mineral phases were sought and not found: cinnabar, eglestonite, schuetite, kleinite, mosesite, terlinguite. Results are shown in Table 2, showing a summary of Hg species identified in the samples and the calculated first shell coordination number for each Hg species.

TABLE 2

| Example | Source | Species (%) | Coordination Number (CN) |
|---|---|---|---|
| 16 | SE Asian Crude-1 (toluene washed) | B-HgS (101) HgSe (10) | 2.61 ± 0.26 |
| 17 | SE Asian Crude-3 (as is) | B-HgS (91) Hg-(SR)$_2$ (24) | 2.40 ± 0.98 1.22 ± 0.85 |
| 18 | North American Crude 1 | B-HgS (104) | 2.61 ± 0.17 |
| 19 | SE Asian Crude-5 | B-HgS (139) | 3.46 ± 0.21 |
| 20 | South American Crude 1 | B-HgS (129) | |

The percentages of mercury in the samples were calculated by comparison to standards and with measurement of the mercury content of the sample. Metacinnabar (B-HgS) is the predominant species for all stabilized crudes obtained from around the world. On occasion traces of mercury selenide are seen. Higher amounts of related mercury dithiol (Hg-(SR)$_2$) can be seen in samples that are not washed with toluene solvent. The dithiol is believed to be an intermediate product from the reaction between elemental mercury and mercaptans. It eventually condenses to form metacinnabar which adsorbs on the surface of the formation material. The standard used for analysis of the dithiol was HgCysteine. The coordination numbers below 4 indicate that the metacinnabar crystallites are either very small (nanometer scale), or are very poorly crystalized, or both.

SEM and TEM studies show that the metacinnabar can be present as either micron-sized aggregates of nanometer sized metacinnabar crystallites, or as nanometer sized metacinnabar crystallites coating the outside of other micron-sized solids, typically formation material—quartz, clay and the like. Because the metacinnabar crystallites are in the nanometer size range, they are difficult or impossible to detect by conventional XRD because of line broadening. The metacinnabar nanoparticles can also be converted to diethyl mercury using ethyl chloride. Reagent metacinnabar powders show little or no reactivity presumably due to their lower surface area and larger crystal size.

Examples 21 to 30

Determination of Percent Particulate Hg by Centrifugation

Ten ml of the following seven crudes were placed in a small centrifuge tube. Samples that were fluid at room temperature were centrifuged at room temperature. Samples that were waxy at room temperature were heated to 40° C. The samples were spun at 1800 RPM for 10 minutes. The mercury content of the supernatant was measured by Lumex and compared to the mercury content of the original sample, and the ratio was used to calculate the percent particulate mercury. Results are summarized in Table 3.

TABLE 3

| Example | Source | Percent Particulate Hg by Centrifuge |
|---|---|---|
| 21 | SE Asian Condenate-1 | 92 |
| 22 | SE Asian Condenate-6 | 80 |
| 23 | SE Asian Condenate-2 | 22 |
| 24 | SE Asian Condenate-3 | 31 |
| 25 | North Am. Crude-1 | 76 |
| 26 | North Am. Crude-2 | 85 |
| 27 | SE Asian Condenate-4 | 82 |
| 28 | SE Asian Condenate-5 | 75 |
| 29 | SE Asian Condenate-7 | 72 |
| 30 | SE Asian Condenate-8 | 73 |

Percent Particulate Mercury=100*(Original $Hg$–Centrifuged $Hg$)/(Original $Hg$)

Examples 31 to 38

Determination of Presence of Particulate Metals Other than Mercury

In order to determine the presence of particulate metals, other than mercury, the metal contents of a series of crudes and condensates were analyzed by ICP-MS before and after filtering through a 0.2 µm filter. The percentages removed are shown in Table 4.

TABLE 4

| Ex. No. | Source | As | Cu | Fe | Mn | Mo | Na | Ni | Pb | Sb | Se | V | Zn |
|---|---|---|---|---|---|---|---|---|---|---|---|---|---|
| 31 | SE Asian Crude-1 | 83 | <0 | 72 | | | <0 | <0 | | <0 | | 0 | 13 |
| 32 | North Am. Crude-1 | 44 | <0 | 13 | | 56 | 72 | 0 | | 89 | 34 | 1 | 7 |
| 33 | SE Asian Condenate-1 | 52 | | | | | 35 | | | | | | 31 |
| 34 | SE Asian Condenate-2 | 25 | <0 | 53 | | | | <0 | | | | 1 | −13 |
| 35 | SE Asian Crude-2 | 18 | <0 | | | | 15 | <0 | | | | | 11 |
| 36 | SE Asian Crude-3 | 47 | <0 | | | | 40 | <0 | 4 | | | | 15 |
| 37 | SE Asian Crude-4 | −13 | <0 | | | 5 | −12 | <0 | | <0 | | | 4 |
| 38 | SE Asian Crude-5 | 71 | 8 | 55 | 52 | | 26 | <0 | 28 | | | <0 | 29 |

From this data, the following metals generally show more than 10% removal by the 0.2 µm filter and are particulate metals: Arsenic (As), Iron (Fe), Manganese (Mn), Molybdenum (Mo), Sodium (Na), Lead (Pb), Antimony (Sb), Selenium (Se) and Zinc (Zn). The following metals generally cannot be removed by filtration and are not examples of particulate metals: Copper (Cu), Nickel (Ni) and Vanadium (V). Copper, Nickel and Vanadium have been speciated in crudes as part of molecular porphorin structures. As molecular porphorins they are not particulate.

Examples 39 to 42

Removal of Mercury from Refinery Wastewater by Use of Oleophilic Activated Carbons A refinery wastewater sample that contained mercury was obtained. It was treated with 10% activated carbon from four samples: Activated carbon, Ground activated carbon, Sulfur impregnated activated carbon from Calgon Carbon Corporation (Pittsburgh, Pa.), and Sulfur impregnated activated carbon from Siemens AG (Munich, Germany). The wastewater was mixed with the carbons and allowed to react over time. Samples were periodically withdrawn, filtered to remove the carbon and analyzed for mercury. Results are summarized in Table 5.

TABLE 5

| Time, Minutes | Example 39 Activated Carbon | Example 40 Ground Activated Carbon | Example 41 Sulfur impregnated activated carbon from Calgon Carbon | Example 42 Sulfur impregnated activated carbon from Siemens |
|---|---|---|---|---|
| 0 | 0.79 ppb | 0.79 ppb | 0.79 ppb | 0.79 ppb |
| 10 | 0.64 ppb | 0.22 ppb | 0.49 ppb | 0.56 ppb |
| 50 | 0.25 ppb | 0.15 ppb | 0.23 ppb | 0.17 ppb |

All of the carbons were effective in reducing the traces of mercury from the refinery wastewater.

Example 43

Produced Water Sample

A sample of produced water from a North American location was obtained. The produced water was formation water. It was black with visible floating black particles and contained 1877 ppb mercury as measured by Lumex. Using optical microscopy, particles of 100 µm and smaller were observed. These particles were aggregates of solids along with droplets of oil.

Examples 44 to 48

Removal of Mercury from Produced Water by Use of Oleophilic Adsorbents

Ten ml samples of the produced water from example 43 were placed in 40 ml volatile organic analysis (VOA) vials. Small quantities of various oleophilic adsorbents were added. One layer from a polypropylene pig mat was separated and used in example 48. The vials were capped and mixed on a vortex mixer for two minutes. They were allowed to settle overnight. The mercury content was measured again. Results are shown in Table 6.

TABLE 6

| Example | Adsorbent | Wt. of adsorbent, grams | Settled Sol. Hg, ppb | Settled % Removed |
|---|---|---|---|---|
| 44 | None | 0.0000 | 894 | 52.36 |
| 45 | Darco Carbon Aldrich 242276 | 0.1003 | 52 | 97.25 |
| 46 | Act Carbon Aldrich C2889 | 0.1066 | 351 | 81.30 |
| 47 | Mesoporous Carbon Aldrich 702110 | 0.1086 | 53 | 97.18 |
| 48 | Layer from Pig Mat MAT203 | 0.1014 | 53 | 97.18 |

Example 49

Flow Adsorption with Polypropylene Filter

A layer from the polypropylene pig mat used in Example 48 was removed from the mat and cut into a circle to fit on a 47 mm glass filter. Large pre-formed holes in the layer were blocked with masking tape. The filter was placed on top of an Erlenmeyer flask and a vacuum was drawn. Three hundred ml of the produced water from example 43 was passed through the filter. Within seconds, 250 ml were processed forming a cloudy tan liquid. An oily cake built up on the surface of the polypropylene film. This was gently stirred and an additional 50 ml of produced water rapidly flushed through the film. The ratio of the volume of the water (300 cm$^3$) to the superficial area of the adsorbent (70 cm$^2$) was 4.2 cm. The superficial area in this case was calculated using 4.7 cm as the diameter.

The filtered water had mercury content below the limit of detection by Lumex, 50 ppb. The residue on the polypropylene film was dried and found to contain 485,000 ppb mercury. This demonstrates that the deposited oily metal particles can be removed and the oleophilic adsorbent then reused.

The polypropylene layer was not acting as a filter because the pores were not uniform and were likely very large. It was acting as an adsorbent.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A process for removing metal particles from water, comprising (a) contacting a volume of water containing neutrally buoyant metal particles with an oleophilic adsorbent material wherein the neutrally buoyant metal particles are adsorbed by the oleophilic adsorbent material, (b) separating the oleophilic adsorbent material from the volume of water thereby forming a treated volume of water, (c) wherein the separating step is carried out by a separation process selected from the group consisting of allowing the oleophilic adsorbent material to settle by gravity, filtering the oleophilic adsorbent material from the volume of water and combinations thereof.

2. The process of claim 1 wherein the oleophilic adsorbent material comprises a material selected from the group consisting of a carbon material, a polymeric material, a clay material and a combination thereof.

3. The process of claim 1 wherein the polymeric material is selected from the group consisting of polypropylene, polyethylene, polyurethane, polyvinyl chloride, polystyrene and a combination thereof.

4. The process of claim 1 wherein the polymeric material comprises polypropylene.

5. The process of claim 1 wherein the polymeric material contains recycled polymer.

6. The process of claim 1 wherein the clay material is selected from the group consisting of bentonite, pulverulent clay, montmorillonite, kaolin, halloysite and combinations thereof.

7. The process of claim 1 wherein the oleophilic adsorbent material is in an amount of from 0.01 wt % to 25 wt % based on the weight of the volume of water containing neutrally buoyant metal particles.

8. The process of claim 1 wherein the oleophilic adsorbent material is in the form of a filter body and the volume of water contacts the filter body.

9. The process of claim 7 wherein the oleophilic adsorbent material has a superficial area to volume ratio of from 1 to 1,000,000.

10. The process of claim 1 wherein the contacting the volume of water containing neutrally buoyant metal particles with the oleophilic adsorbent material occurs in an adsorption bed at a liquid hourly space velocity of from about 0.1 hr−1 to about 1000 hr−1.

11. The process of claim 9 wherein the liquid hourly space velocity is from about 1 hr−1 to about 100 hr−1.

12. The process of claim 9 wherein the liquid hourly space velocity is from about 5 hr−1 to about 200 hr−1.

13. The process of claim 1, further comprising using the treated volume of water to wash crude, condensate or a combination thereof.

14. The process of claim 1 wherein at least about 50 wt % of the neutrally buoyant metal particles in the volume of water are adsorbed by the oleophilic adsorbent material.

15. The process of claim 1 wherein at least about 75 wt % of the neutrally buoyant metal particles in the volume of water are adsorbed by the oleophilic adsorbent material.

16. The process of claim 1 wherein at least about 90 wt % of the neutrally buoyant metal particles in the volume of water are adsorbed by the oleophilic adsorbent material.

17. The process of claim 1 wherein at least about 95 wt % of the neutrally buoyant metal particles in the volume of water are adsorbed by the oleophilic adsorbent material.

18. The process of claim 1 wherein at least about 99 wt % of the neutrally buoyant metal particles in the volume of water are adsorbed by the oleophilic adsorbent material.

19. The process of claim 1 wherein the neutrally buoyant metal particles contain mercury.

20. The process of claim 1 wherein the volume of water containing neutrally buoyant metal particles comprises wastewater from a hydrocarbon production operation.

* * * * *